E. C. EMERY.
PROCESS OF TREATING FOOD REMNANTS.
APPLICATION FILED SEPT. 9, 1912.
1,141,622.
Patented June 1, 1915.
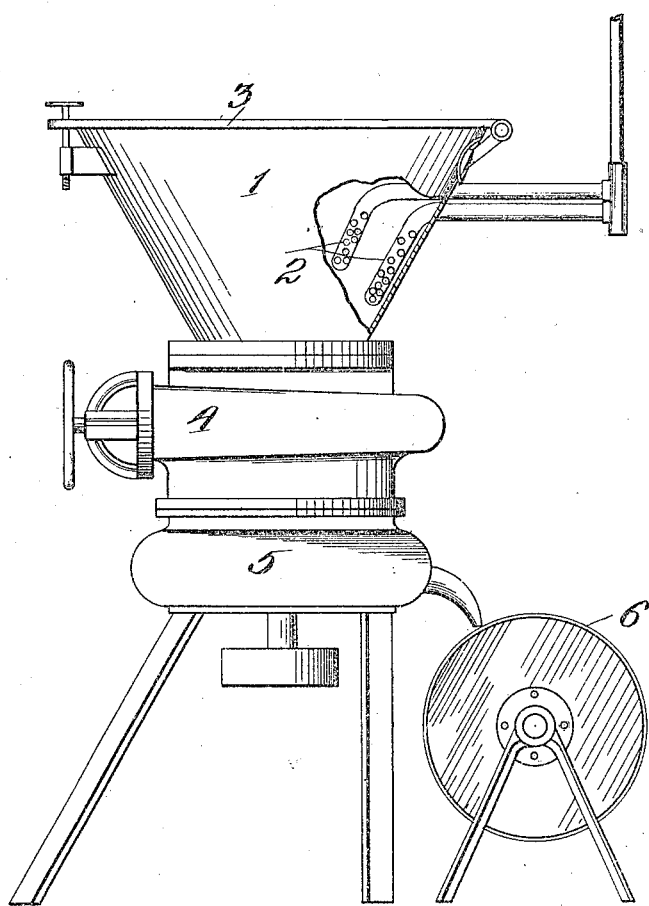
Witnesses:
Catherine M. Burke
Eliza Fitch Lawson
Inventor:
Edward C. Emery

UNITED STATES PATENT OFFICE.

EDWARD C. EMERY, OF LOS ANGELES, CALIFORNIA.

PROCESS OF TREATING FOOD REMNANTS.

1,141,622. Specification of Letters Patent. Patented June 1, 1915.

Application filed September 9, 1912. Serial No. 719,460.

*To all whom it may concern:*

Be it known that I, EDWARD C. EMERY, a citizen of the United States, residing at Los Angeles, in the county of Los Angeles and State of California, have invented a certain new and useful Process of Treating Food Remnants, of which the following is a specification.

This invention relates to a process of preparing a feed from pure and untainted kitchen and table remnants, and has for its object to produce a condensed foodstuff in which the nutritious ingredients are conserved and effectually preserved against micro-organic attack.

The accompanying drawing shows an apparatus for carrying out the process.

It consists of a receiving chamber 1, into which steam under pressure is delivered through preferably perforated nozzles 2, by means of which the food remnants after being sealed in said chamber by the closing of the cover 3, and the gate valve 4, are agitated, sterilized and to a certain extent macerated. Simultaneously the coagulated greases and fats are dissolved. After the subjection of the mass to the action of steam, the gate valve 4, is opened, causing thereby the contents of the chamber 1, to gravitate to a grinder 5, which reduces the vegetable and softer matters of the mass to a pulp and triturates the harder matters, such as bones, corn-cobs, and the like. From the grinder, the mass is expelled and caused to be deposited continuously in a thin stratum upon a slowly revolving heated drum 6, which vaporizes and drives off the excess moisture and thoroughly dries the product.

The action of the steam on the waste aggregate, as stated, sterilizes the same, without, however, cooking or extracting from them any of the essential juices, and dissolves the fats and greases, which in a large measure are absorbed by particularly the amylaceous constituents of the remnants. The unabsorbed greases and fats are caused to amalgamate and combine with the pulpous residuum during the grinding operation. When the pulp is delivered upon the revolving drum, only surplus moisture is dispersed, and the thickness of the stratum is determined by the speed of the drum and the heat, also by the quantity of moisture contained in the mass, which according to chemical analysis, comprises about 59%.

While the excess moisture is being driven off during the revolution of the drum, a further and final absorption of the greasy and fatty elements of the mass occurs, their presence preventing the scorching of the product and giving to it the brownish color characteristic of toast. When the stratum of pulp is removed from the drum it is found that none of the greasy or fatty substances are perceptible, and the final product is an enriched and concentrated food containing every essential of nutrition and possessing all of the nutriment originally in the individual foods from which this product is made.

It will be understood that in carrying out this process, the unconsumed and discarded food remnants are immediately subjected to treatment by this process when collected.

What I claim, is:—

Preparing a homogeneous food product from clean waste food of an unspoiled character, consisting in subjecting the waste foods to steam under pressure for a prolonged time in a closed vessel to sterilize the same and prevent the condensation of the steam, without cooking or extracting any of the juices from the foods and to dissolve and cause an absorption of the dissolved greases and fats by the foods treated, then reducing the mass to a homogeneous pulp and causing a further absorption of the dissolved greases and fats, and finally toasting the mass.

In testimony whereof I affix my signature in the presence of two witnesses.

EDWARD C. EMERY.

Witnesses:
CATHERINE M. BURKE,
ANTON GLOETZNER, Jr.